United States Patent

Rao et al.

[11] Patent Number: 5,104,425
[45] Date of Patent: Apr. 14, 1992

[54] GAS SEPARATION BY ADSORBENT MEMBRANES

[75] Inventors: Madhukar B. Rao, Allentown; Shivaji Sircar, Wescosville; Timothy C. Golden, Allentown, all of Pa.

[73] Assignee: Air Products and Chemicals, Inc., Allentown, Pa.

[21] Appl. No.: 724,063

[22] Filed: Jul. 1, 1991

Related U.S. Application Data

[63] Continuation of Ser. No. 436,566, Nov. 14, 1989.

[51] Int. Cl.$^5$ .............................................. B01D 53/22
[52] U.S. Cl. ................................... 55/16; 55/68; 55/74; 55/75; 55/158; 55/387; 55/389; 55/DIG. 5
[58] Field of Search ................. 55/16, 68, 74, 75, 158, 55/387, 389

[56] References Cited

U.S. PATENT DOCUMENTS

| | | | |
|---|---|---|---|
| 4,583,996 | 4/1986 | Sakata et al. | 55/16 |
| 4,847,145 | 7/1989 | Matsui | 55/16 X |
| 4,853,001 | 8/1989 | Hammel | 55/16 |
| 4,865,630 | 9/1989 | Abe | 55/158 |
| 4,888,033 | 12/1989 | Charpin et al. | 55/158 |
| 4,909,989 | 3/1990 | Fukazawa et al. | 55/16 X |
| 4,925,459 | 5/1990 | Rojey et al. | 55/16 |
| 4,971,696 | 11/1990 | Abe et al. | 55/158 X |
| 4,981,676 | 1/1991 | Minet et al. | 55/16 X |

*Primary Examiner*—Robert Spitzer
*Attorney, Agent, or Firm*—John M. Fernbacher; James C. Simmons; William F. Marsh

[57] ABSTRACT

Composite semipermeable membranes comprising porous adsorptive material supported by a porous substrate are disclosed for use in a process for the separation of multicomponent gas mixtures. In the process, one or more primary components adsorb within the pores of the adsorptive material and diffuse by surface flow through the membrane to yield a permeate stream enriched in one or more of the primary components. Methods for making the composite membranes are described.

19 Claims, No Drawings

GAS SEPARATION BY ADSORBENT MEMBRANES

This is a continuation of application Ser. No. 07/436,566 filed on Nov. 14, 1989.

FIELD OF THE INVENTION

This invention pertains to the field of gas separation by porous membranes, and in particular to adsorptive composite porous membranes.

BACKGROUND OF THE INVENTION

Fluid mixtures can be separated by selective diffusion through membranes under concentration or pressure gradients by utilizing differences in transport and thermodynamic partition or equilibrium properties of the mixture components in the membrane materials. One widely-used type of membrane comprises a non-porous polymer in which the mixture components selectively dissolve and selectively permeate or diffuse in the soluble state through the polymer to yield a permeate product enriched in the selectively diffusing components and a non-permeate or reject product enriched in the remaining components. A second type of membrane comprises a porous solid in which the mixture components selectively diffuse or permeate in the fluid state through the pores to yield a permeate product enriched in the selectively diffusing components and a non-permeate or reject product enriched in the remaining components.

There are four mechanisms by which fluid mixtures, in particular gas mixtures, can be separated by a solid porous membrane. The first of these is diffusion in the gas phase through pores having diameters approaching the mean free path dimensions of the molecules in the gas mixture, which is often termed Knudsen flow or Knudsen diffusion. These pores are small enough, however, to preclude bulk gas flow by molecular diffusion. By this Knudsen flow mechanism, gas molecules of differing molecular weights collide with the pore walls, thus yielding a selective separation in which the permeation rate of each component is inversely proportional to the square root of its molecular weight. The phenomenon of gas diffusion and separation by Knudsen flow through porous solids is well known, and is described in standard textbooks such as "Mass Transfer in Heterogeneous Catalysis", by C. N. Satterfield, MIT Press, 1969.

A second type of separation mechanism for the separation of gas mixtures by porous solids occurs when the diameters of the pores are larger than the largest molecular diameter of the components in the gas mixture and range up to about 40–100 Angstroms in diameter. At the appropriate temperature and pressure conditions, certain components in the gas mixture will condense within the pores by capillary or Kelvin condensation and flow through the pores as a condensed phase under a capillary pressure gradient across the membrane. Condensed molecules within the pores hinder or eliminate the diffusion of non-condensing molecules, and a selective separation between components in the gas mixture is thus accomplished.

A third type of separation mechanism occurs when the pore diameters of the membrane are larger than the largest molecular diameter of the components in the gas mixture and typically smaller than about 2 to 5 times this diameter, and thus are smaller than pores in which Knudsen diffusion dominates. These pores have typical diameters of about 3 to 20 Angstroms and are termed micropores by the classification definition of the International Union of Pure and Applied Chemistry (I.U.P.A.C.). In the present disclosure, the term "pores" will be used to denote pores of any size, including micropores. When a gas mixture is contacted with a porous membrane at temperature and pressure conditions well-removed from conditions at which capillary condensation occurs, the separation mechanism defined as selective surface flow or selective surface diffusion can occur under a pressure gradient across the membrane. This mechanism is characterized by the selective adsorption of certain mixture component molecules within the pores and the surface flow of these molecules in the adsorbed phase through the pores. Furthermore, the adsorbed phase hinders the gas-phase Knudsen diffusion of non-adsorbed or weakly adsorbed component molecules through the pores, and an enhanced selective separation between components in the gas mixture is thus accomplished.

The fourth mechanism by which gas mixtures are separated by a solid porous membrane material is that of molecular sieving in which essentially all of the pores are larger than certain component molecules and smaller than other component molecules in the mixture. Larger molecules cannot enter these pores, while smaller molecules can enter and diffuse through the pores, and a selective separation based upon exclusion by molecular size is thus accomplished.

Since porous solids contain a distribution of pore sizes, more than one of these mechanisms can occur simultaneously depending upon the actual pore size distribution and sizes of component molecules in the gas mixture, as well as the pressure and temperature. However, a single mechanism usually dominates and the resulting mixture separation is essentially accomplished by means of that dominant mechanism.

The separation of gaseous mixtures by capillary condensation in solid porous membranes is described by M. Asaeda and L. D. Du in a paper entitled "Separation of Alcohol/Water Gaseous Mixtures by a Thin Ceramic Membrane" in the *Journal of Chemical Engineering of Japan*, Vol. 19, No. 1, pp. 72–77 (1986). This article describes the preparation of a silica-alumina membrane about 10 microns thick, having pores ranging between 2 and 10 nanometers (20 to 100 Angstroms) in diameter, which is supported on a porous ceramic substrate. The silica-alumina membrane was prepared by applying alumina sol to the substrate, drying at 80° C., and firing at 450° C. The pores were decreased to the desired size by treatment with aluminum isopropoxide and with dilute sodium silicate solution, and the resulting membrane was aged in humid air and washed in boiling water. The resulting membrane was contacted in a series of experiments with binary saturated gaseous mixtures of water and methanol, water and ethanol, and water and isopropanol. Water condensed in the pores of the membrane by capillary or Kelvin condensation, and the permeability of water in all cases was higher than the permeabilities of the alcohols, all of which have a higher molecular size and weight than water. The water/alcohol gas mixtures were separated by the mechanisms of capillary condensation and molecular sieving.

U.S. Pat. No. 4,583,996 discloses an apparatus comprising an inorganic hydrophilic porous membrane for separating a condensible gas, especially water vapor, from a gas mixture at conditions under which the condensible gas selectively permeates through the membrane to the exclusion of non-condensing gases. An inorganic membrane of sodium borosilicate glass is disclosed for such a separation, in which the pores range up to 100 Angstroms in diameter and preferably are from 4 to 40 Angstroms in diameter, and which has a preferred thickness of 5 microns to 1 mm. Other condensible vapors are disclosed which can be recovered by these membranes such as acetic acid, toluene, and n-propylamine.

U.S. Pat. No. 3,511,031 also discloses an aparatus for removing water vapor from a gas by means of capillary condensation by hydrophilic membranes having mean pore diameters between 3 and 100 Angstroms. These membranes were fabricated in the form of plates or tubes made of porous carbon or porous glass having a thickness of about 1.2 mm.

U.S. Pat. No. 3,022,187 discloses a porous membrane for separation of a gas mixture by gaseous diffusion which is made by depositing particles of a metallic oxide within the pores of a sintered porous metallic support. The metallic oxide particles, having dimesions on the order of 100 to 10,000 Angstroms, are suspended in a fluid and the resulting suspension is drawn into the pores of the metallic support to deposit the particles therein. The membrane is then dried, yielding pores with an average mean diameter of 120 Angstroms as determined by permeability measurements.

The preparation and use of activated carbon membranes for gas separation by molecular sieving are described in an article by J. E. Koresh and A. Sofer entitled "Molecular Sieve Carbon Perm-selective Membrane, Part 1, Presentation of a New Device for Gas Mixture Separation", in *Separation Science and Technology* 18(8), pp. 723-734 (1983). Activated carbon membranes in the form of hollow fibers were prepared by pyrolysis of polymeric hollow fibers at 800° C. and 950° C. to produce porous hollow fiber membranes with various pore size distributions and a wall thickness of about 6 microns. Pore diameters were shown to range from those which allow binary mixture separations by molecular sieving a size exclusion up to larger diameters which allow Knudsen flow. Pure-component permeability of these various membranes were measured for He, $O_2$, $N_2$, and $SF_6$.

U.S. Pat. No. 4,685,940 discloses porous carbon membranes for separating gas mixtures by molecular sieving. One group of membranes was prepared by pyrolysis of cellulose hollow fiber or flat sheet membranes at 950° C. to yield a porous membrane with a pore size range of 2-2.5 Angstroms with a very sharp cutoff above 2.5 Angstroms as determined by low permeability to helium and hydrogen and undetectable permeability to nitrogen, methane, and sulfur hexafluoride. A similar membrane heated only to 800° C. yielded a pore size range of 2.5 to 3.0 Angstroms with a sharp cutoff above 3.0 Angstroms as determined by high permeability to helium and hydrogen and negligible permeability to nitrogen and methane. Other membranes having similar properties were prepared by pyrolysis of a commercial asymmetric polymeric membrane, by chemical vapor deposition of various organic gases on a porous graphite tube, or by plasma deposition of carbon on porous graphite. Post treatment of selected membranes by various methods to enlarge the pores was carried out to provide for molecular sieving of larger molecules. These membranes, which have pore sizes generally in the range of 2.5 to 5.0 Angstroms, are specifically prepared for separating binary gas mixtures in which the molecular sizes differ by 10% or less. The specific pore size for a given separation is such that the pore diameters are between the molecular diameters of the two gases to be separated, and there is no significant number of pores which are 10% or larger in size than the smaller of the molecular sizes of the two gases.

U.S. Pat. No. 4,699,892 describes asymmetric composite membranes which have an ultrathin layer of zeolite on a porous substrate and methods for the production of such membranes. The active ultrathin layer is a cage-shaped zeolite composed of a 6-, 8-, 10-, or 12-membered oxygen ring window having aluminum or gallium atoms, silicon or germanium atoms, and oxygen atoms as constituent members. These zeolite crystals have pore sizes in the range of about 3 to 12 Angstroms which are useful for separating gas mixtures by molecular sieving and which also may have catalytic activity. The use of such membranes is disclosed for the separation by molecular sieving of n-paraffins and n-olefins from light petroleum fractions; butene-1 from $C_4$ hydrocarbon fractions; $H_2S$, $CO_2$, and mercaptans from LPG; $H_2O$, $CO_2$, $N_2$, and hydrocarbons from air to yield oxygen-enriched air; and the separation of argon from oxygen.

An apparatus for removing water vapor from gases by capillary condensation using a porous hydrophilic membrane is disclosed in U.S. Pat. No. 3,511,031. The membrane used is homogeneous, has a mean pore diameter between 3 and 100 Angstroms, and is made of porous glass or porous pressed carbon.

The diffusion of adsorbable gas mixtures through porous media by the mechanism of surface flow was described in a paper by R. Ash, R. M. Barrer, F. R. S. Pope, and C. G. Pope entitled "Flow of Adsorbable Gases and Vapors in a Microporous Medium. II. Binary Mixtures" in *Proceedings of the Royal Society* A271, 19, pp. 19-33 (1963). Several binary gas mixtures were fractionated by diffusion through a high surface area porous carbon plug 0.91 cm in length. The carbon plug was made by compacting non-porous, micron-sized graphitized carbon black particles which provided a high surface area carbon plug with microporosity between the carbon particles. The dominant mode of diffusion of the less volatile, more strongly adsorbed components was by adsorbed phase surface flow through the pores of the carbon plug. Furthermore, the blockage of gas-phase (Knudsen) diffusion through the pores of the carbon plug by the adsorbed phase created on the surface of the non-porous carbon particles was found to be an effective secondary mechanism in separating gas mixtures by this membrane. In experiments with a mixture of hydrogen and sulfur dioxide, the porous carbon plug became impermeable to the non-adsorbed $H_2$ while being permeable to the strongly adsorbed $SO_2$. Very effective separation by this mechanism was also observed with nitrogen-carbon dioxide and neon-carbon dioxide mixtures. In mixtures of argon and nitrogen, which are adsorbed within pores of the plug to a comparable extent, a much lower degree of separation was observed.

In an article entitled "Surface Flow and Separation in Microporous Media", published in the *A.I.Ch.E-I.Chem.E. Symposium Series* No. 1, pp. 112-121 (1965), R. M. Barrer described experiments on the separation of binary gas mixtures by surface flow in porous glass, carbon, and aluminasilica catalyst plugs having mean pore hydraulic radii between 3.0 and 14.4 Angstroms. It was found that even in the Henry's law range where the adsorption isotherms are linear with pressure, surface flow or surface diffusion through the highest surface area porous carbon plug was the dominant mechanism for gas transport. For a very dense adsorbed phase in the pores, the concomitant gas-phase flow was completely blocked. Separations in binary mixtures of $H_2$ and $SO_2$ were studied at $-20.7°$ and $-33°$ C. for the carbon plug or membrane, and highly efficient separation was observed between the adsorbable component ($SO_2$) and the less-adsorbable component ($H_2$). Effective separation was also observed between Ne and $CO_2$, and $N_2$ and $CO_2$, at $-83°$ C. A useful enrichment of Ar in Ar-$N_2$ mixtures at $-195°$ C. was also observed.

R. Ash, R. M. Barrer, and R. T. Lowson studied the diffusion of gases and gas mixtures through carbon plugs and reported the results in a paper entitled "Transport of Single Gases and of Binary Gas Mixtures in a Microporous Carbon Membrane" published in *JCS Faraday Transactions* I, 69, 2166 (1973). The carbon membrane or plug was prepared by compressing non-porous carbon black into a porous plug 0.976 cm thick having pores with a mean hydraulic radius of 5.5 Angstroms. Binary mixtures of $H_2$ and $N_2$, He and $NH_3$, $H_2$ and $NH_3$, and $N_2$ and $NH_3$ were tested at 223° to 273° K. with this carbon plug, and the experiments showed that ammonia could be separated from these mixtures very effectively by surface flow in which ammonia adsorbed within and diffused through the pores while blocking the diffusion of the lighter gases. Similar studies using carbon plugs were carried out using helium, carbon dioxide, and various hydrocarbons by R. Ash, R. M. Barrer, and P. Sharma and were reported in an article entitled "Sorption and Flow of Carbon Dioxide and Some Hydrocarbons in a Microporous Carbon Membrane" published in *Journal of Membrane Science*, 1 (1976) 17-32. Blockage of pores between the non-porous carbon particles in these carbon plugs by adsorbed films of carbon dioxide or hydrocarbons hindered diffusion of helium through the pores, and indicated that this carbon plug can effect separation by surface flow of mixtures of strongly adsorbed and weakly adsorbed components.

SUMMARY OF THE INVENTION

The invention is a composite semipermeable membrane comprising porous adsorptive material supported by a porous substrate, a series of methods for making the membrane, and a process for the separation of a multicomponent fluid mixture containing one or more primary components and one or more secondary components comprising bringing the fluid mixture into contact with a first surface of the composite semipermeable membrane, wherein a significant portion of at least one of the primary components is selectively adsorbed within the pores in the adsorptive material and permeates through the pores by surface flow in an adsorbed fluid phase to produce a first fluid product enriched in at least one of the primary components at a second surface of the membrane, and withdrawing the remaining fluid mixture from contact with the first surface of the membrane to yield a second fluid product enriched in the secondary components.

A method for making a layered composite semipermeable membrane for the separation of a multicomponent fluid mixture containing one or more primary components and one or more secondary components comprises the steps of: (a) coating a surface of a porous substrate with a layer of a precursor material; (b) heating the resulting coated porous substrate in an inert atmosphere to a temperature sufficient to convert the precursor material into a layer of porous adsorptive material; and (c) cooling the resulting composite membrane to ambient temperature; wherein the porous adsorptive material can selectively adsorb a significant portion of at least one of the primary components and has a pore size distribution such that at least 10% of the pores have diameters larger than the largest of the molecular diameters of the primary and secondary components. Precursor materials can include polymeric materials which are carbonized by heating in an inert atmosphere to form a layer of porous activated carbon on the surface of the substrate or inorganic materials which are dried and crystallized to form a layer of porous inorganic adsorbent material on the surface of the substrate. The porous adsorptive material forms a layer up to about 20 microns thick.

A method is also disclosed for making a densified composite semipermeable membrane for the separation of a multicomponent fluid mixture containing one or more primary components and one or more secondary components comprising the steps of: (a) introducing a precursor into the pores of a porous substrate; (b) heating the porous substrate containing the precursor under conditions sufficient to convert the precursor to porous adsorptive material within the pores; and (c) cooling the resulting composite membrane to ambient temperature; wherein the porous adsorptive material can selectively adsorb a significant portion of at least one of the primary components and has a pore size distribution such that at least 10% of the pores have diameters larger than the largest of the molecular diameters of the primary and secondary components. The porous adsorptive material can be activated carbon formed by the carbonization of polymeric materials or by the deposition of carbon by vapor phase cracking of gaseous hydrocarbons followed by activation in an oxidizing atmosphere.

A method is also disclosed for making a densified composite semipermeable membrane for the separation of a multicomponent fluid mixture containing one or more primary components and one or more secondary components comprising the steps of: (a) introducing a suspension of porous adsorptive particles in a liquid into the pores of a porous substrate; (b) heating the porous substrate containing the suspension of adsorptive porous particles to a temperature sufficient to evaporate the liquid whereby the particles are deposited within the pores; and (c) cooling the resulting membrane to ambient temperature; wherein the porous adsorptive particles can selectively adsorb a significant portion of at least one of the primary components and have a pore size distribution such that at least 10% of the pores have diameters larger than the largest of the molecular diameters of the primary and secondary components.

DETAILED DESCRIPTION OF THE INVENTION

The porous composite semipermeable membrane of the present invention allows the practical application of the mechanism of adsorbed surface flow to the separation of fluid mixtures, particularly non-condensible gas mixtures. In order to effect gas separations by utilizing adsorbed surface flow, the pore size distribution of the porous material is critical. As earlier described, gas separation and diffusion through porous membranes can occur by four distinct mechanisms. First, when the pore size distribution in the porous material is such that pores have diameters intermediate the diameters of component molecules in a gas mixture, a separation is effected by molecular exclusion or molecular sieving. At much larger pore sizes, in which the pore diameters approach the mean free paths of the component molecules in a gas mixture, the well-known mechanism of Knudsen diffusion occurs and a separation can be effected due to molecular collision with pore walls. When at least a portion of the pores in the porous material are larger than the molecular diameters of key mixture components to be separated, but not large enough for significant Knudsen diffusion to occur, dense phase diffusion can occur. When pressure, temperature, and gas composition are such that certain components in the mixture can condense in the pores due to Kelvin or capillary condensation, these components condense and diffuse through the pores as a liquid under a capillary pressure gradient, thus effecting a separation of the gas mixture. In the porous semipermeable membrane of the present invention, a porous adsorptive material selectively adsorbs a significant portion of at least one of the primary components in the gas mixture, the adsorbed components diffuse by surface flow in an adsorbed phase through the pores due to adsorbed phase concentration gradients created by pressure gradients across the membrane, and the diffusion product is thus enriched in at least one of the primary components. The presence of adsorbed primary components in the pores hinders the diffusion of less-strongly adsorbed or non-adsorbed secondary components, so that the non-diffusion or reject product is enriched in the secondary components. The predominant mechanism of this separation is that of adsorbed phase surface flow. The membrane of the present invention is operated at temperature above which or pressures below which Kelvin or capillary condensation can occur for the gas mixtures of interest. The membrane of the present invention is thus applied only to the separation of non-condensible gas mixtures.

The pore size distribution in the porous adsorptive material of the present invention is such that at least 10% of the pores are larger than the largest of the molecular diameters of the primary and secondary components to be separated, and that at least 50% of the pores are smaller than about five times this largest molecular diameter. Preferably, at least 90% of the pores are smaller than about three times this largest molecular diameter. These pore size distributions described herein are defined on a volume basis wherein a given percentage of the total pore volume of the porous solid is made up of pores larger or smaller than a given diameter.

Gas mixtures of particular interest for separation by the porous semipermeable membrane of the present invention, as described more fully below, typically comprise but are not limited to the components given in Table 1 which also lists the molecular diameters of the components. For the purpose of the present disclosure, the molecular diameter is defined as the kinetic diameter, $\sigma$, as described in the text "Zeolite Molecular Sieves" by D. W. Breck, Kruger Publishing Co., 1984, pp 633-645, and in particular Table 8.14 at p. 636.

TABLE 1

| Component | Molecular Diameter, $\sigma$, Angstroms |
|---|---|
| Helium | 2.6 |
| Hydrogen | 2.89 |
| Carbon Dioxide | 3.3 |
| Oxygen | 3.46 |

TABLE 1-continued

| Component | Molecular Diameter, $\sigma$, Angstroms |
|---|---|
| Nitrogen | 3.64 |
| Carbon Monoxide | 3.76 |
| Methane | 3.8 |
| Ethylene | 3.9 |
| Propane | 4.3 |
| n-Butane | 4.3 |

In the separation of a mixture including propane or butanes, for example, according to the criteria described earlier, the porous adsorptive material of the present invention should have a size distribution such that at least 10% of the pores are larger than 4.3 Angstroms in diameter and at least 50% are smaller than 21.5 Angstroms in diameter. Preferably at least 90% of the pores are less than 12.9 Angstroms in diameter.

In the separation of any given gas mixture using the membrane of the present invention, the temperature and pressure are selected such that for any composition of the gas mixture Kelvin or capillary condensation does not occur to any significant extent.

The composite semipermeable membrane of the present invention, in contrast with prior art porous materials for effecting gas separation by surface flow of adsorbed components, is a thin, composite membrane suitable for use in commercial membrane modules. The net diffusion of gaseous components through a membrane is proportional to the fundamental permeability of the components through the membrane, the membrane area, and the pressure or concentration gradient across the membrane, and is inversely proportional to the thickness of the active layer of membrane material. This is well known in the membrane gas separation field, and leads to the fact that in order to achieve commercial membrane modules of practical size and membrane surface area, the active membrane thickness must be very small, for example generally less than about one micron when polymeric membranes are used. For porous semipermeable membranes, the thickness of the active membrane layer likewise must be minimized; the thickness of the active layer of porous material in the asymmetric or layered composite membranes of the present invention is less than about 20 microns. Prior art porous semipermeable membranes or plugs of porous material for gas separation by surface flow comprise homogeneous porous material many orders of magnitude thicker than that of the present invention. Such membranes or plugs are made typically of compacted particles of materials such as graphitized carbon black and are about 9 mm thick.

The composite semipermeable membrane of the present invention comprises a porous adsorptive material supported by a porous substrate or support material. The composite membrane can be made in two different configurations: (1) a layered composite membrane in which the porous adsorptive material forms a very thin layer on a surface of the porous substrate; or (2) a densified composite membrane in which the porous adsorptive material is contained within the pores of the substrate. The adsorptive material and the substrate in the composite membrane can be the same material or different materials. A layered composite membrane having the same material in both the active layer and the substrate layer is also defined as an asymmetric membrane. The term composite membrane as used in the present disclosure thus refers to a membrane made up of different parts which have different properties, in contrast to a homogeneous membrane having the same properties throughout.

The layered composite membrane of the present invention can be made by several different methods. In one embodiment, the surface of a porous substrate is coated with a precursor material which upon appropriate heating is converted into a layer of porous adsorptive material which promotes the separation of the gas mixture of interest. The porous substrate can be a ceramic, carbonaceous, metallic, or polymeric material, or combinations thereof, which has a distribution of pore diameters between about 0.2 and 50 microns and which has essentially no effect upon the diffusion and separation of the gas mixture of interest. The substrate can be in the form of a flat sheet or a hollow fiber or tube. The typical thickness of a flat sheet substrate is 10 to 500 microns and the wall thickness of a hollow fiber or tube substrate is 3 to 500 microns.

In a first method of making the layered composite membrane, the substrate is coated with a layer of a latex containing polyvinylidene chloride, polyvinyl chloride, polyacrylonitrile, styrene-divinyl benzene copolymer, or mixtures thereof, or other polymers. The latex can contain a single polymer or a mixture of polymers, and may contain small amounts of other compounds to control certain physical properties of the latex. The latex is applied to the surface of the substrate by a suitable method such as brushing, spraying, or immersion, and the amount of latex applied is controlled so that a desired thickness of the final layer of porous adsorptive is obtained. A suitable substrate for this membrane is porous graphite having an average pore diameter between about 0.2 and 50 microns and a typical thickness of 250 microns.

The latex-coated substrate is then heated in an inert atmosphere such as nitrogen at a heating rate of up to 1.0° C./min to a maximum temperature of between 600° and 1200° C., followed by cooling to room temperature. The cooling rate is critical, and should generally be done at less than 10° C./min. The heating pyrolyzes or carbonizes the polymer to yield a thin layer of porous carbon on the surface of the substrate to form an asymmetric or layered composite membrane. The porous material formed in this manner can selectively adsorb and separate components of the gas mixtures of interest previously described. Performance optionally can be improved by repeating the latex coating and carbonization steps one or more times, up to typically four or five times.

While the adsorptive membranes prepared by this procedure can perform satisfactory gas separations, the porous material optionally can be treated by additional steps to further enhance the surface and diffusion properties with respect to certain gas mixture components. The properties of such membranes can also be enhanced for example by crosslinking the polymer before carbonization. Such cross-linking methods include heating in an oxygen-containing gas, exposure to ultraviolet or x-ray radiation, chlorination, or sulfonation. It is preferred to fabricate these membranes so that the active porous carbon layer is less than about 20 microns thick.

Layered composite membranes with porous carbon as the active membrane layer also can be prepared by controlled carbonization of commercially available asymmetric polymeric membranes. For example, a commercially available asymmetric membrane comprising polyacrylonitrile and polyvinylidene chloride can be carbonized and converted to an asymmetric adsorptive membrane by heating at controlled temperatures under an inert atmosphere. The resulting carbon membrane can be activated by further heating in an oxidizing atmosphere containing nitrogen or carbon oxides, oxygen, air, steam, or mixtures thereof.

Layered composite membranes can be prepared having inorganic porous adsorptive material as the active part of the membrane. A porous substrate, generally selected from ceramic, carbonaceous, metallic, and polymeric materials or combinations thereof as previously stated, is coated with an inorganic precursor such as a silicic acid solution, alumina sol, alumino-silicate gel, or alumino-phosphate gel. The precursor, in either a solution or colloidal suspension as appropriate, can be applied to the surface of the substrate by spraying, brushing, immersion, or any other suitable method. The precursor-coated substrate is then heated under controlled conditions to produce a layer of adsorptive porous inorganic crystalline material on the porous substrate. A certain amount of this inorganic adsorptive material can be leached out by alkali or acid wash if desired to control the thickness and pore size distribution of the material. A typical inorganic membrane made in this manner, for example, using an aluminosilicate gel as a precursor will yield upon controlled heating a layer of zeolite which is the active membrane layer. Typically the heating step is carried out in an inert atmosphere at a heating rate of about 10° C./min up to a maximum temperature of 50° C. to 400° C. Heating of the other precursors listed above, namely, silicic acid, alumina sol, and alumino-phosphate gel, will yield the porous adsorptive inorganic materials silica, alumina, and crystalline alumino-phosphate, respectively. It is also possible to utilize metal oxides or clays as the adsorptive inorganic material.

Composite semipermeable membranes of the present invention also can be prepared by forming porous adsorptive material within the pores of a porous substrate. This type of an adsorptive membrane is defined herein as a densified composite membrane to distinguish it from the layered composite membrane earlier described. In one embodiment, porous carbon is formed within the pores of an appropriate substrate by introducing a polymer solution into the pores and heating the substrate to evaporate the solvent and deposit polymer within the pores. The polymer is then carbonized under conditions similar to those earlier discussed to yield a porous carbon structure. Further controlled heating in an oxidizing atmosphere optionally can be utilized to impart improved porosity and adsorptive properties to the carbonized material. In this additional step, oxidizing gas mixtures containing nitrogen oxides, carbon oxides, oxygen, air, steam, or mixtures thereof can be used. Polymers selected from polyvinylidene chloride, polyvinyl chloride, polyacrylonitrile, styrene-divinylbenzene copolymer, or mixtures of these or other polymers, can be used for fabricating these densified composite membranes. Suitable solvents such as toluene, tetrahydrofuran, dimethylformamide, or dimethyl sulfoxide can be used to dissolve the polymer(s) for introduction into the pores of the porous substrate.

The deposition of porous carbon within the pores of the porous substrate also can be accomplished in another embodiment of the present invention by vapor-phase thermal cracking of selected hydrocarbons within the pores to deposit carbon therein. These hydrocarbons can be selected from straight and branched chain alkanes and alkenes, benzene or its derivatives, or mixtures thereof. Thermal vapor phase cracking of these hydrocarbons generally takes place at temperatures between 300° and 900° C. The carbon deposited within the porous substrate by the method of this embodiment may have sufficient adsorptive properties to effect gas separation by the mechanism of adsorbed surface flow. If such properties are not achieved by the initial deposition of carbon, the densified composite membrane can be further treated by heating in an oxidizing atmosphere as discussed earlier to impart improved microporosity and adsorptive properties to the carbon within the substrate pores.

In another embodiment of the present invention, densified composite membranes are prepared by introducing inorganic precursors into the pores of porous substrates. The precursor can be an aqueous solution of alumino-silicate, alumino-phosphate, aluminum hydroxide, or silicic acid, or a colloidal suspension of silica gel, alumina gel, clay, or metal oxide. The precursor is introduced into the pores of the substrate by immersion or surface application followed by capillary uptake into the pores. Alternately, the precursor can be forced into the pores by means of a suitable pressure differential established by pressurization or vacuum. After the precursor has been introduced into the substrate pores, the precursor-laden substrate is heated in an inert atmosphere to drive off water, deposit the precursor within the pores, and convert the precursor into a solid crystalline porous adsorptive material. Depending upon the precursor selected, the porous adsorptive material can be a zeolite, an alumina gel, a silica gel, or crystalline alumino-phosphate. Typical temperatures required to convert these precursors into porous adsorptive material range between 50° C. and 400° C. The densified composite inorganic membrane thus produced can be treated further to modify the porosity or adsorptive properties of the adsorptive material by ion exchange, reaction with hydrocarbon gases, or reaction with silicon-containing gases such as silane.

In a further embodiment of the present invention, densified composite membranes are prepared by introducing a suspension of porous adsorptive carbonaceous or inorganic particles into the pores of porous substrates. The suspension can be an aqueous or organic suspension of carbon, zeolite, or crystalline alumino-phosphate particles. The porous particles are introduced into the pores of the substrate by immersion or surface application of the suspension followed by capillary uptake into the pores. Alternatively, the suspension can be forced into the pores by means of a suitable pressure differential established by pressurization or vacuum. After the porous particles have been introduced into the pores of the substrate, the support is heated in an inert atmosphere to remove the solvent and deposit the particles with the pores of the substrate. Typical temperatures required to remove the suspension liquid from the support pores range from 50° to 250° C. The densified composite membrane thus produced can be treated further to modify the porosity or adsorptive properties of the adsorptive material by treatment at temperatures between 400° to 900° C. in an oxidizing atmosphere containing oxygen, air, carbon oxides, nitrogen oxides, steam, or mixtures thereof; ion exchange; or reaction with silicon-containing gases such as silane. In addition, any large voids which may remain in the membrane and through which non-selective Knudsen or molecular diffusion may occur can be sealed by coating the support material with a thin layer less than about 1 micron thick of a high-permeability, low-selectivity polymeric material such as a silicon-containing polymer.

The active membrane thickness is a critical factor in the commercial application of these composite membranes as discussed earlier. The method of preparing the layered composite adsorptive membrane, in particular the amount of precursor applied to the porous substrate, should be carefully controlled to yield a final composite membrane having a layer of porous adsorptive material which is less than 20 microns thick. For the densified composite membrane, the actual thickness of the active adsorptive porous material within the pores of the substrate cannot be determined physically. However, the amount of precursor or adsorptive material introduced into the pores of the substrate should be controlled carefully to yield a membrane with permeabilities similar to those of the layered composite membrane. The densified composite membrane has a total thickness about the same as that of the initial substrate, and this thickness is generally less than 3 mm.

The substrate for all composite porous membranes described herein is selected from ceramic, carbonaceous, metallic, and polymeric materials and may comprise combinations thereof. The substrate has pores between about 0.2 and 50 microns in diameter.

EXAMPLE 1

A layered composite membrane was prepared by cutting a two-inch diameter disk from a sheet of porous graphite and drying the disk for about 30 minutes under dry nitrogen at 150° C. After drying the disk and cooling to room temperature, approximately 0.1 cc of a polymer dispersion (latex) was dispersed by syringe onto the disk and was spread over the surface of the disk using a brush. The coated disk was placed on a motor and spun at 3,000 rpm for one minute to remove excess latex. The coated disk was air dried at ambient temperature for about one to two hours, and was then placed in a drying oven under nitrogen at 150° C. for about five minutes. The coated disk was then heated under nitrogen to 1,000° C. at a heating rate of 1° C./minute, was held at 1,000° C. for three hours, and then was cooled to room temperature under nitrogen at 10° C./min. The entire procedure was repeated once. This asymmetric membrane was designated as Membrane I.

The graphite substrate used is a commercially-available material designated as Type DFP-1 graphite sheet manufactured by POCO Graphite Co. The average pore diameter of this material is about 0.7 microns; the material has a porosity of 20% and a thickness of 250 microns. The polymer latex is a commercially available aqueous dispersion of 0.1–0.14 micron polymer beads containing 55 wt % solids; the polymer is a polyvinylidene chloride-acrylate terpolymer. This material is sold under the trade name DARAN by W. R. Grace and Co., and the specific type used in this example was DARAN 8600.

Membrane I was tested for binary gas permeabilities by passing a 50 mol % $CO_2$–50 mol % $H_2$ mixture at 20°, 0°, and −20° C. over one surface of the membrane at 2.36 bar total pressure while passing a helium sweep gas at ambient pressure over the other surface. The rates of $CO_2$ and $H_2$ permeation were calculated by analyzing the composition of the low pressure effluent gas using a gas chromatograph and determining the effluent gas flow rate. The results summarized in Table 2 show that a high permeability of $CO_2$ can be achieved at 20° C. with a selectivity of 3.2 for $CO_2$ over $H_2$, in which selectivity is defined as the ratio of the actual permeabilities of $CO_2$ and $H_2$. The $CO_2$ permeability decreased as the temperature was lowered to −20° C., but the $CO_2$ selectivity over hydrogen increased to 5.7 due to more selective adsorption of $CO_2$ over $H_2$ at the lower temperature.

TABLE 2

Binary Mixture Gas Permeabilities
Double-Coated Carbon Membrane
1000° C. Carbonization Temperature
(Membrane I)

| Temperature, °C. | Permeability, Barrers* | | Selectivity, $CO_2$:$H_2$ |
|---|---|---|---|
| | $H_2$ | $CO_2$ | |
| 20 | 350 | 1130 | 3.2 |
| 0 | 240 | 1080 | 4.6 |
| −20 | 170 | 980 | 5.7 |

*Units of $(10^{-10}$ cc STP · cm)/(cm Hg · Sec · cm$^2$)

The permeability of Membrane I for $CO_2$ and $H_2$ from the 50/50 binary mixture is compared in Table 3 with permeabilities of polymeric membranes for pure $CO_2$ and $H_2$ taken from the "Polymer Handbook", 2nd edition, edited by Brandrup, Immergut, and McDowell, Wiley, New York, 1975, p.III-229. These data show that the layered composite porous membrane of the present invention exhibits permeabilities which are orders of magnitude higher than those of polymeric membranes, and has $CO_2$: $H_2$ selectivities similar to most of the polymeric membranes.

TABLE 3

Comparison of Polymeric Membranes
with Membrane I of the Present Invention

| Membrane | Temperature, °C. | Permeability, Barrers | | Selectivity, $CO_2$:$H_2$ |
|---|---|---|---|---|
| | | $CO_2$ | $H_2$ | |
| Polytetrafluoroethylene | 25 | 11.7 | 9.8 | 1.2 |
| Polychloroprene | 25 | 25.8 | 13.6 | 1.9 |
| Butadiene-Acrylonitrile Copolymer | 25 | 63.1 | 25.2 | 2.5 |
| Polybutadiene | 25 | 138 | 42 | 3.3 |
| Cellulose Acetate | 25 | 22.7 | 3.5 | 6.5 |
| Membrane I | 20 | 1130 | 350 | 3.2 |
| Cellulose Acetate | −20 | 22.6 | 3.5 | 6.5 |
| Membrane I | −20 | 980 | 170 | 5.7 |

EXAMPLE 2

A second membrane was made using the same procedure as for Membrane I, except that four layers of carbonized polymer were applied to the graphite substrate. This membrane, designated as Membrane II, was used to determine permeabilities for pure components and for binary mixtures of hydrogen with methane, ethane, propane, and $CO_2$, wherein each mixture contained 50 mole % hydrogen. The binary data were determined by steady state countercurrent experiments in which a pressurized feed gas of known composition was passed at a fixed flow rate across the high pressure side of the membrane and a helium sweep gas was passed at a known flow rate over the low pressure side of the membrane countercurrent to the direction of the feed flow. The gas compositions of the high pressure and low pressure effluent streams were measured using a gas chromatograph and the corresponding flow rates were measured using wet test meters.

Pressures were 3.72 atm on the high pressure side of the membrane and 1.06 atm on the low pressure side of the membrane, which was purged with helium. Pure gas permeabilities were measured in batch experiments with a constant pressure of 1.86 atmospheres on the high pressure side of the membrane and less than 150 Torr or 0.20 atmospheres on the low pressure side. Results of these experiments are given in Table 4.

TABLE 4

Mixed and Pure Gas Permeabilities
for Membrane II (Barrers)

| Component | T. °C. | In Mixture with $H_2$ | | Pure Component Permeability |
|---|---|---|---|---|
| | | Permeability | Selectivity vs. $H_2$ | |
| Carbon Dioxide | 25 | 1800 | 7.1 | 3360 |
| Methane | 25 | 570 | 1.5 | 820 |
| Ethane | 25 | 450 | 9.7 | 1200 |
| Propane | 25 | 280 | 24.3 | — |
| Carbon Dioxide | −16 | 1500 | 26 | 3300 |
| Methane | −15 | 530 | 2.5 | 860 |
| Ethane | −13 | 340 | 17.1 | — |
| Propane | −15 | 190 | 48 | 560 |

EXAMPLE 3

A third membrane was made using the same procedures as for Membranes I and II, except that five layers of carbonized polymer were applied to the substrate. Three additional replicate membranes were made in parallel by the same procedure. The four membranes, each having five layers, were designated as Membranes IIIA, IIIB, IIIC, and IIID. Each had a total porous carbon layer thickness of 2.6 to 2.8 microns. These membranes were tested for pure and mixed gas permeabilities using the same procedure as Example 2. In order to test the permeability and reproducibility of Membranes IIIA, IIIB, IIIC, and IIID, pure component permeabilities were measured at 295° K. and 1.85 atm on the high pressure side of the membrane, and the results are given in Table 5. It can be seen that the four membranes exhibited fairly consistent pure gas permeabilities. Permeabilities also were measured for multicomponent mixtures containing hydrogen, methane, ethane, propane, and butane at 295° K. by the method discussed in Example 2. The high pressure side of the membrane was controlled at 4.4 atm and the low pressure side was swept with helium at 1.07 atm. The results of these experiments are given in Table 6.

TABLE 5

Pure Gas Permeabilities for
Membranes IIIA, IIIB, IIIC, and IIID
(Barrers)
T = 295° K.

| Gas | IIIA | IIIB | IIIC | IIID |
|---|---|---|---|---|
| He | 22 | 31 | 28 | 37 |
| $H_2$ | 150 | 129 | 145 | 175 |
| $CO_2$ | 631 | 1054 | 973 | — |
| $CH_4$ | 335 | 663 | 551 | 421 |
| $C_2H_6$ | 556 | 851 | 1020 | 863 |
| $C_3H_8$ | 153 | 291 | 336 | 282 |
| $C_4H_{10}$ | 96 | 156 | 190 | 156 |

TABLE 6

Multicomponent Gas Permeabilities
for Membranes IIIA, IIIB, IIIC, IIID
(Barrers)
T = 295° K.

| Component | IIIA Permeability | IIIA Selectivity over H2 | IIIB Permeability | IIIB Selectivity over H2 | IIIC Permeability | IIIC Selectivity over H2 | IIID Permeability | IIID Selectivity over H2 |
|---|---|---|---|---|---|---|---|---|
| $CH_4$ | 1.0 | 1.4 | 1.3 | 1.1 | 1.9 | 0.9 | 1.8 | 1.0 |
| $C_2H_6$ | 5.4 | 7.7 | 7.2 | 6.0 | 10.6 | 5.0 | 10.7 | 5.9 |
| $C_3H_8$ | 18.0 | 25.7 | 24.1 | 20.1 | 37.4 | 17.7 | 38.3 | 21.3 |
| $C_4H_{10}$ | 91.8 | 131.1 | 120.0 | 100.0 | 233.0 | 110.5 | 244.8 | 136.0 |
| $H_2$ | 0.7 | — | 1.2 | — | 2.1 | — | 1.8 | — |

Gas Composition (mole %):
Membranes IIIA and IIIB: 20.2% $CH_4$, 9.5% $C_2H_6$, 9.4% $C_3H_8$, 19.9% $C_4H_{10}$, 41.0% $H_2$
Membranes IIIC and IIID: 8% $CH_4$, 4% $C_2H_6$, 4% $C_3H_8$, 4% $C_4H_{10}$, 80% $H_2$ The results of the experiments of Examples 1, 2, and 3 confirm that layered composite membranes can be prepared successfully and that higher molecular weight, more strongly adsorbed components permeate through the membranes selectively over lighter components such as hydrogen. The results also show that such membranes can be prepared reproducibly as confirmed in Example 3, Table 6.

The membranes of the present invention can be utilized to separate a wide variety of gas mixtures in addition to the hydrogen-containing mixtures described in the Examples. Any gas mixture which contains primary and secondary components that are adsorbed to differing degrees by the porous composite adsorptive membrane can be separated. Preferably, at least 10% of the pores in the adsorptive material of the membrane have diameters greater than the largest of the molecular diameters of the primary and secondary components in the multicomponent fluid mixture. Preferably, at least 50% of the pores have diameters less than about five times the largest molecular diameter of the primary and secondary components in the multicomponent fluid mixture. The process is useful for but not limited to the separation of a range of gas mixtures including the following: one or more paraffinic, olefinic, or aromatic hydrocarbons as primary components and hydrogen as a secondary component; carbon dioxide as a primary component and hydrogen as a secondary component; carbon monoxide as a primary component and hydrogen as a secondary component; carbon monoxide as a primary component and methane as a secondary component; carbon dioxide as a primary component and methane as a secondary component; and nitrogen as a primary component and oxygen as a secondary component. For the separation of such mixtures the composite semipermeable membrane should have at least 10% of the pores greater than 4.3 Angstroms in diameter and at least 50% of the pores less than 21.5 Angstroms in diameter.

An important and distinguishing feature of the composite semipermeable membranes of the present invention is that the higher molecular weight components of a mixture, for example carbon dioxide and light hydrocarbons, diffuse much more readily through the membrane than lower molecular weight components such as hydrogen. This differs from the separation of such mixtures by polymeric membranes, in which the reverse behavior occurs, that is, lower molecular weight components such as hydrogen selectively diffuse through the membrane while higher molecular weight components such as light hydrocarbons are selectively rejected. Similar behavior occurs when such mixtures are separated by porous membranes which utilize the principle of size exclusion or molecular sieving as earlier discussed. This feature of the membranes of the present invention allows the purification of important low molecular weight gases such as hydrogen at potentially lower cost when compared with the use of polymeric membranes, which recover the low molecular weight gas product as a permeate stream at low pressure. The membranes of the present invention recover the low molecular weight product as a non-permeate or reject stream at a high pressure, and thus the large pressure drop across the membrane which occurs with polymeric membranes is avoided. Another advantage of porous composite adsorptive membranes for the purification of valuable low molecular weight products such as hydrogen is realized when the impure feed gas contains relatively dilute amounts of higher molecular weight contaminants. When a polymeric membrane system is used, the low molecular weight product permeates through the membrane, and the membrane surface area is thus determined by the required product flow rate. When an equivalent amount of this low molecular weight product is purified using the porous adsorptive membranes of the present invention, however, the required membrane surface area and/or feed pressure can be reduced significantly since only the much smaller volume of higher molecular weight components permeates through the membrane. The separation thus can be accomplished at a potentially lower cost with the membranes of the present invention than with polymeric membranes.

The present invention has several other advantages over polymeric membranes for the separation of fluid mixtures. First, much higher permeation rates are possible while retaining satisfactory selectivity between the components to be separated, and this can reduce substantially the membrane surface area needed for the separation. Second, the membranes of the present invention can operate at lower pressure differentials than polymeric membranes in general, which can reduce compression costs and simplify membrane module construction.

The porous adsorptive membrane is an advance over prior art porous adsorptive material for separating gas mixtures. As earlier discussed, separation of gas mixtures by adsorptive surface flow has been demonstrated by several workers using homogeneous porous plugs formed by compressing non-porous carbon black or an inorganic powder, or by fabricating such a plug from porous glass. These plugs were on the order of about one cm thick, and while the separation of gas mixtures by adsorptive surface flow was effectively demonstrated, permeation rates through material of such a thickness were much too low for practical commercial applications. The thin, composite porous adsorptive membranes of the present invention as described herein exhibit the overall permeation rates and selectivities required for the economic separation and recovery of commercially important gases.

We claim:

1. A process for the separation of a multicomponent fluid mixture containing one or more primary components and one or more secondary components comprising:
   (a) bringing said fluid mixture into contact with a first surface of a composite semipermeable membrane comprising porous adsorptive material supported by porous substrate, said porous substrate having essentially no effect upon the separation of said fluid mixture and serving only to support said porous adsorptive material, wherein a significant portion of at least one of said primary components is selectively adsorbed within pores in said adsorptive material and permeates through said pores by surface flow in an adsorbed fluid phase to produce a first fluid product enriched in at least one of said primary components at a second surface of said membrane; and
   (b) withdrawing the remaining fluid mixture from contact with said first surface to yield a second fluid product enriched in said secondary components.

2. The process of claim 1 wherein said porous adsorptive material has a pore size distribution such that at least 10% of said pores have diameters larger than the largest of the molecular diameters of said primary and secondary components.

3. The process of claim 1 wherein said fluid mixture is a gas mixture comprising one or more hydrocarbons as said primary components and hydrogen as one of said secondary components, said hydrocarbons being selected from the group consisting of paraffinic, olefinic, and aromatic compounds.

4. The process of claim 1 wherein said fluid mixture is a gas mixture containing carbon dioxide as one of said primary components and hydrogen as one of said secondary components.

5. The process of claim 1 wherein said fluid mixture is a gas mixture containing carbon monoxide as one of said primary components and hydrogen as one of said secondary components.

6. The process of claim 1 wherein said fluid mixture is a gas mixture containing carbon monoxide as one of said primary components and methane as one of said secondary components.

7. The process of claim 1 wherein said fluid mixture is a gas mixture containing carbon dioxide as one of said primary components and methane as one of said secondary components.

8. The process of claim 1 wherein said fluid mixture is a gas mixture containing nitrogen as one of said primary components and oxygen as one of said secondary components.

9. A composite porous semipermeable membrane for the separation of a multicomponent fluid mixture comprising a porous adsorptive material supported by a porous substrate, said porous substrate having essentially no effect upon the separation of said fluid mixture and serving only to support said porous adsorptive material, wherein at least 10% of the pores in said porous adsorptive material are larger than 4.3 Angstroms in diameter, and wherein a significant portion of at least one component in said fluid mixture can be selectively adsorbed within said pores such that said component selectively permeates through said membrane by surface flow in an adsorbed phase, whereby the fluid permeating through said membrane is enriched in said component.

10. The composite porous semipermeable membrane of claim 9 wherein said porous adsorptive material is selected from the group consisting of activated carbon, zeolite, activated alumina, clay, metal oxide, and silica gel.

11. The composite porous semipermeable membrane of claim 9 wherein said porous substrate has a distribution of pore diameters between about 0.2 and 50 microns and is selected from the group consisting of ceramic, carbonaceous, metallic, and polymeric materials and combinations thereof.

12. The composite porous semipermeable membrane of claim 9 wherein said porous adsorptive material is attached as a layer less than about 20 microns thick on a surface of said porous substrate to form a layered composite membrane.

13. The composite porous semipermeable membrane of claim 9 wherein said porous adsorptive material is contained within the pores of said porous substrate to form a densified composite membrane.

14. A method for making a layered composite semipermeable membrane for the separation of a multicomponent fluid mixture containing one or more primary components and one or more secondary components comprising the steps of:
   (a) coating a surface of a porous substrate with a layer of a polymeric material selected from the group consisting of polyvinylidene chloride, polyvinyl chloride, polyacrylonitrile, styrene-divinylbenzene copolymer, and mixtures thereof;
   (b) heating the resulting coated porous substrate in an inert atmosphere to a temperature sufficient to carbonize said polymeric material to form a layer of porous adsorptive material; and
   (c) cooling the resulting composite membrane to ambient temperature;
wherein said porous adsorptive material can selectively adsorb a significant portion of at least one of said primary components and has a pore size distribution such that at least 10% of the pores have diameters larger than the largest of the molecular diameters of said primary and secondary components.

15. The method of claim 14 wherein following step (a) said polymeric material is crosslinked by heating in an oxygen-containing gas, exposure to ultraviolet radiation, exposure to x-rays, chlorination, or sulfonation.

16. The method of claim 14 wherein following step (b) said membrane is heated under an oxidizing atmosphere containing gases selected from the group consisting of carbon oxides, nitrogen oxides, air, oxygen, steam, and mixtures thereof.

17. The method of claim 14 wherein said polymeric material comprises polyvinylidene chloride, wherein said porous substrate is graphite, and wherein said polyvinylidene chloride is applied to the surface of said graphite as a latex.

18. The method of claim 17 wherein said polyvinylidene chloride and said porous substrate are heated in an inert atmosphere to a maximum temperature of between 600° C. and 1200° C. at a heating rate of up to about 1.0°

C. per minute to form a layer of carbonaceous porous adsorptive material.

19. A method for making a densified composite semipermeable membrane for the separation of a multicomponent fluid mixture containing one or more primary components and one or more secondary components comprising the steps of:
  (a) introducing a solution of a polymer in a suitable solvent into the pores of a porous substrate, wherein said polymer is selected from the group consisting of polyvinylidene chloride, polyacrylonitrile, polyvinyl chloride, styrene-divinylbenzene copolymer, and mixtures thereof;
  (b) heating said porous substrate containing said solution under conditions sufficient to evaporate said solvent, deposit said polymer within said pores, and carbonize said polymer to form porous adsorptive material within said pores; and
  (c) cooling the resulting composite membrane to ambient temperature;

wherein said porous adsorptive material can selectively adsorb a significant portion of at least one of said primary components and has a pore size distribution such that at least 10% of the pores have diameters larger than the largest of the molecular diameters of said primary and secondary components.

* * * * *